United States Patent
Leibowitz

(10) Patent No.: US 9,074,585 B2
(45) Date of Patent: Jul. 7, 2015

(54) SOLAR THERMAL POWER GENERATION USING MULTIPLE WORKING FLUIDS IN A RANKINE CYCLE

(75) Inventor: Herman Leibowitz, Danville, CA (US)

(73) Assignee: TAS Energy, Inc., Houston, TX (US)

( * ) Notice: Subject to any disclaimer, the term of this patent is extended or adjusted under 35 U.S.C. 154(b) by 1118 days.

(21) Appl. No.: 13/059,813

(22) PCT Filed: Aug. 19, 2009

(86) PCT No.: PCT/US2009/054357
§ 371 (c)(1),
(2), (4) Date: May 12, 2011

(87) PCT Pub. No.: WO2010/022184
PCT Pub. Date: Feb. 25, 2010

(65) Prior Publication Data
US 2011/0209474 A1   Sep. 1, 2011

Related U.S. Application Data

(60) Provisional application No. 61/090,097, filed on Aug. 19, 2008.

(51) Int. Cl.
*F03G 6/00* (2006.01)
*F01K 23/04* (2006.01)
*F01K 25/08* (2006.01)
*F03G 6/06* (2006.01)
*F01K 25/10* (2006.01)
*F22B 1/00* (2006.01)

(52) U.S. Cl.
CPC ............... *F03G 6/067* (2013.01); *F01K 23/04* (2013.01); *F01K 25/10* (2013.01); *F22B 1/006* (2013.01); *Y02E 10/46* (2013.01)

(58) Field of Classification Search
USPC .............. 60/618, 620, 641.8, 641.11, 641.15, 60/651, 655, 671
See application file for complete search history.

(56) References Cited

U.S. PATENT DOCUMENTS

| | | | |
|---|---|---|---|
| 3,234,734 A | 2/1966 | Buss et al. | |
| 4,192,144 A * | 3/1980 | Pierce | 60/641.8 |
| 4,249,386 A * | 2/1981 | Smith et al. | 60/693 |
| 4,573,321 A * | 3/1986 | Knaebel | 60/649 |
| 4,760,705 A * | 8/1988 | Yogev et al. | 60/651 |
| 5,497,624 A | 3/1996 | Amir et al. | |
| 6,981,377 B2 * | 1/2006 | Vaynberg et al. | 60/641.8 |
| 7,191,597 B2 * | 3/2007 | Goldman | 60/641.8 |
| 8,561,405 B2 * | 10/2013 | Ast et al. | 60/618 |
| 2009/0000299 A1 * | 1/2009 | Ast et al. | 60/618 |
| 2009/0320473 A1 * | 12/2009 | Krieger et al. | 60/641.2 |

FOREIGN PATENT DOCUMENTS

| | | |
|---|---|---|
| EP | 0122017 A2 | 10/1984 |
| EP | 0122017 A3 | 9/1985 |
| WO | WO 2006138459 A2 * | 12/2006 |

OTHER PUBLICATIONS

International search report and written opinion dated Dec. 23, 2010 for PCT Application No. US2009/054357.

* cited by examiner

*Primary Examiner* — Christopher Jetton
(74) *Attorney, Agent, or Firm* — Haynes and Boone, LLP

(57) ABSTRACT

A system to convert the heat collected by solar thermal collectors into electricity using a Rankine cycle generator with multiple working fluids and multiple temperature-level heat sources is disclosed.

10 Claims, 5 Drawing Sheets

SOLAR THERMAL POWER GENERATION USING MULTIPLE WORKING FLUIDS IN A RANKINE CYCLE

CROSS-REFERENCE

This application claims the benefit of U.S. Provisional Application No. 61/090,097, filed Aug. 19, 2008, which application is incorporated herein by reference in its entirety.

FIELD OF INVENTION

The invention relates generally to the generation of electricity using solar collectors and an organic Rankine cycle. In particular, the invention relates to the generation of electricity from solar collectors using different temperature heat sources in a multiple-fluid Rankine cycle system.

BACKGROUND OF THE INVENTION

The generation of electric power (or electricity) using a Rankine cycle in conjunction with the heat produced in a solar collector system is in widespread use. The solar thermal collectors are typically of a trough, dish or central receiver (power tower) design. Of these, the parabolic, tracking trough-type collectors appear to be the most popular. Typically, these systems reflect the solar rays to a cylindrical pipe (receiver) located at the focal point of the collector. Thermal oil flowing within the pipe is heated and then circulated to a boiler, where steam is produced, typically in the temperature range of about 500° F.-700° F. There are some collector designs that are optimized to produce lower temperature thermal oil, typically at a temperature of about 400° F.

It is well known by those in the power industry that a power plant's thermal efficiency (kW/heat in) is heavily dependent on the maximum temperature of the working fluid operating in the Rankine cycle. This is commonly referred to as the Carnot principle. Thus, solar thermal power plant developers/designers have an incentive to reach the highest temperatures possible within the operating limits of the specified equipment. However, the efficiency of the collectors (heat transmitted to receiver divided by solar energy collected) is inversely proportional to the temperature of the fluid within the receiver. For example, according to data published by Sopogy, Inc., at 150° C. (about 302° F.) above the ambient temperature, the efficiency of a 900 W/m² collector is approximately 70%, while at 300° C. (572° F.) above the ambient temperature, the efficiency falls off to about 50%. Thus there appears to be a trade-off between the power plant's thermal efficiency and solar collector efficiency such that moving to higher fluid temperatures may require a larger collector field than otherwise would have been necessary absent this additional loss.

For large-scale systems, a steam Rankine cycle is typically used. Temperatures above 500° F. are typical. The Nevada Solar One project operates at steam temperature near 700° F.

Prior plant designs have several limitations, such as diminished cost effectiveness and/or environmental stewardship. For instance, steam power plants are usually water cooled (except for very large nuclear plants) using a wet cooling tower. Cooling by air is very expensive due to the very high specific volume of steam. For example, at 100° F., water vapor has a specific volume of about 350 ft³/lb. If an air-cooled condenser were used, the tubes wherein the steam flows would have to be very large, as would all the piping. Very large pipes and tubes equate to large capital cost. The result, therefore, is that steam plant owners usually look for sites where water is available. In a solar plant, particularly those located in the desert, water is scarce. In the case of the 64 MW Nevada Solar One plant, the owners use water cooling and, as a consequence, need to provide approximately 1000 gallons per minute ("gpm") of make-up water to replenish the amount that evaporates in the cooling tower. This is a source of major criticism to those who build solar plants to promote their environmental stewardship. In years to come, it is expected that water for plant cooling will become even more scarce and expensive.

Another example of a limitation of prior plant designs and methods is how, in a typical concentrating solar trough design, all collectors/receivers are built to supply the same high temperature fluid throughout. This results in a low temperature drop (e.g., about 150° F.-250° F.) across the receivers (temperature of fluid leaving the collector field—temperature of fluid entering to the collector field) which, in turn, increases the size of the field required compared to one where the temperature drop was greater (e.g., 300° F.). A larger temperature drop would allow a plant to operate with fewer receivers. However, as noted above, there is a trade-off between performance and economics.

Condensing steam turbines in the 50 MW class can be very large in diameter (condensing stages can be 7-8 feet in diameter), making them expensive and requiring up to three years of manufacturing lead time (Glen Davis, EVP, Ausra Inc.). The latter has the effect of adding substantial cost to the project by delaying power production for at least three years from project commencement.

Off-design conditions are another limitation of prior steam plant designs and methods. Solar energy is inherently cyclic as applied to daily generation. The transition from start-up in the morning to full plant output followed by shut down in the evening imposes a need for plants that can operate at off-design conditions. Unfortunately, steam plants do not do well in these circumstances. As the sun rises in the morning and the plant heats up, the steam turbine's inlet valve remains closed until the steam reaches full temperature and pressure. If steam were admitted to the turbine at part load conditions (lower temperature and pressure) the expansion would result in the formation of moisture (water droplets) in the condensing stages of the turbine which, in turn, would cause erosion damage to the turbine blades (buckets). Thus a standard steam plant practice is to wait for the steam to reach its design or near-design superheated conditions before opening the inlet valve to begin operation. Much of the solar energy that reaches the collectors during non-peak periods is not converted to power, resulting in loss of plant revenue. In some cases this may be mitigated by using natural gas fuel and/or thermal storage to accelerate the warm-up process, but both options may be expensive.

A fully condensing, high temperature steam plant, though having mature technology, is expensive to operate because of the need to keep the water very clean (boiler blow down, de-ionized water, condensate polishing, etc.), free of oxygen (or air), and the need to maintain a deep vacuum at the exit of the turbine. All this adds complexity, additional operator labor and increases in plant running costs.

An organic Rankine cycle (ORC) is an alternative to the steam cycle; it is so named because the working fluid is typically a hydrocarbon or hydrocarbon derivative. The ORC is much better suited to air cooling (specific volume of R245fa vapor at 100° F. is 1.22 ft³/lb; 350 ft³/lb for steam), does not operate in vacuum (the saturation pressure at 100° F. is 33.9 psia), uses smaller turbines (or expanders) requiring shorter lead times, and is less expensive to operate (closed system, hence there is no blow down, condensate polishing, DI water, etc.).

The ORC also overcomes the off-design problem by being able to operate at part load vapor conditions. This is due to the fact that organic fluids are characterized by the shape of their saturation curve, which normally results in an expansion process that reduces moisture as opposed to increasing moisture with steam. Thus, a substantial amount of power can be generated in an ORC plant during the daily warm-up and cool-down periods associated with solar energy.

However, the ORC has its limitations. For example, the ORC has a major disadvantage in not being able to achieve the high temperatures found in steam plants. ORC plants usually top out near 500° F. due to the thermal stability limits of the working fluid. For instance, at some elevated temperature, the working fluid may decompose and lose the properties of the original fluid.

Accordingly, there is a need in the art for solar thermal power plants and ORC systems and methods that overcome the limitations of prior plants, systems and methods.

SUMMARY OF THE INVENTION

The invention provides systems and methods for solar thermal power generation using multiple working fluids. Various aspects of the invention described herein may be applied to any of the particular applications set forth below or for other types of energy collection or energy generation systems. The invention may be applied as a standalone system or method, or as part of an application, such as a power plant. It shall be understood that different aspects of the invention can be appreciated individually, collectively, or in combination with each other.

Aspects of the invention, as shown in FIGS. 1A and 1B, may combine advantageous attributes of the steam cycle with the ORC. Additionally, the invention improves plant economics by using heat supplied at different temperature levels by designing (or specifying) collectors for their designated temperature duty (i.e., high temperature collectors (HTC) for a steam cycle, and low temperature collectors (LTC) for the ORC). In alternate embodiments, heat sources other than solar collectors may be used. Such alternate heat sources may also be designed for various temperature duties.

The invention may improve the economics of solar thermal generation by increasing output, and reducing capital cost and operating cost. This may reduce the all-in cost of solar thermal generation as measured in $/MWh.

Further, by finding a way to overcome the problem of wet cooling and the large make-up requirements associated with wet cooling, solar thermal generation systems and methods of the present invention can overcome major environmental disadvantages of prior systems and methods.

The integration of the steam cycle and the ORC, as opposed to using each separately, may provide design flexibility and an additional degree of freedom that may allow the two subsystems to operate more efficiently and at lower cost than two stand-alone units. By "marrying" or combining the steam cycle with the ORC, the best features of each can be achieved and the disadvantages can be avoided.

Another benefit of the invention may be to utilize the low temperature portion of the ORC during off-design or off-peak operation (i.e., mornings and evenings) to generate power that otherwise would not have been possible if only a high temperature (steam) cycle was in place.

By using two sources of heat for the ORC, such as steam turbine exhaust or steam at less than turbine inlet conditions (lower temperature and dryness) and thermal fluid from low temperature collectors, the plant's overall performance can be optimized, during peak (or on-peak) and off-peak operation, by being able to independently vary the heat supplied from the two (such as steam or thermal fluid from the LTC) sources. The two sources of heat for the ORC may include different types of fluids (e.g., steam, ORC fluid, or a thermal oil) and/or different sources for fluids (e.g., a steam cycle, ORC cycle, or a thermal transfer loop).

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
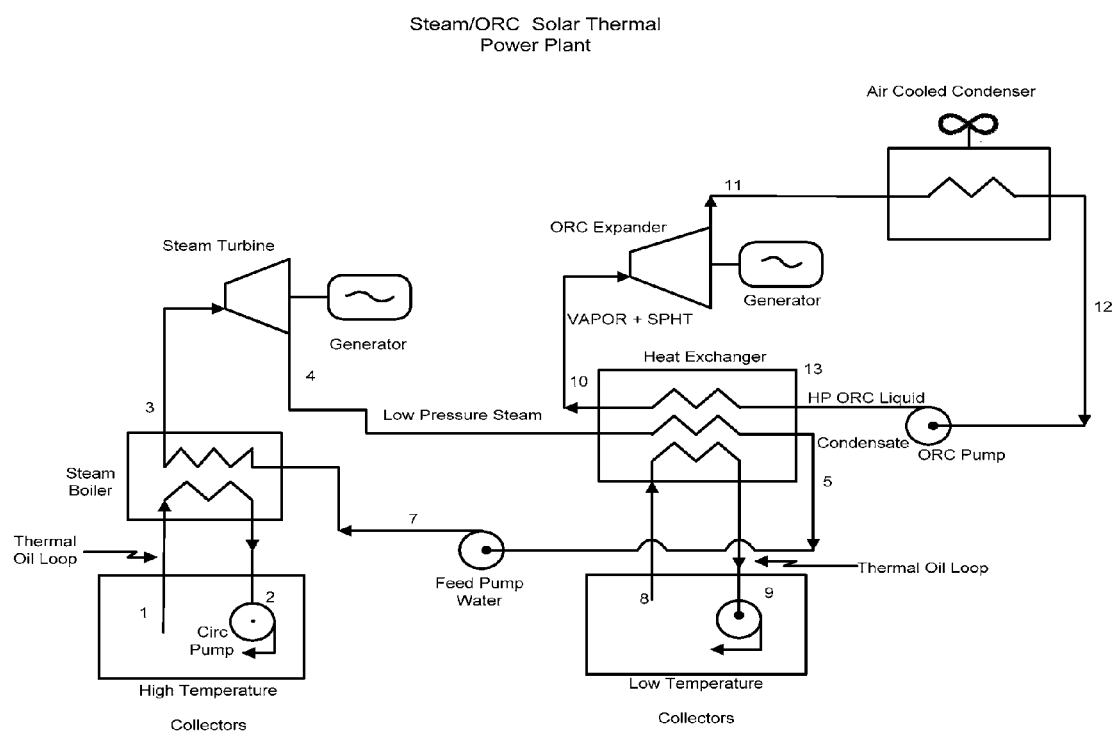
FIG. 1A is a schematic process flow diagram describing the elements of the solar thermal power plant in accordance with one embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides thermal solar power generation using multiple working fluids in a Rankine cycle. Prior power plants and energy generation systems include solar collectors that provide heat at the same temperature. From a system thermodynamics consideration, the use of such uniform collectors is sub-optimal and more expensive than necessary. If the temperature of thermal fluid returning to the collector field is much lower (e.g., 300° F.) than the thermal fluid leaving the field, much of the input heat required can be at a lower temperature than that normally provided in a single temperature level system. For instance, if the thermal fluid is heated from 300° F. to 650° F. or 700° F., a lower temperature collector (which could be less expensive and more efficient) can be used to heat the thermal fluid from about 300° F. to about 450° F., and then a higher temperature collector can be used for heating the fluid from about 450° F. to about 650° F. or 700° F. Accordingly, the fluid can be heated in stages, such as in two stages when two collectors are used.

In various embodiments of the invention, two or more stages can be used to heat various working fluids. Any number of stages corresponding to various solar collectors may be used. In one example, there may be three sets of solar thermal collectors corresponding to high temperature collectors (HTC), medium temperature collectors, and low temperature collectors (LTC). For example, a first stage can be used to heat a fluid from about 300° F. to about 400° F.; a second stage can be used to heat the fluid from about 400° F. to about 500° F.; and a third stage can be used to heat the fluid from about 500° F. to about 650° F. or 700° F. The various stages may be combined in one or more cycles or loops and heat may be transferred in various configurations.

In some embodiments of the invention, the two or more stages to heat the various working fluids may utilize heat sources other than solar collectors. Any discussion of the use of solar collectors may be applied to any heat source known or later anticipated in the art. For example, any discussion of HTCs may be applied to any high temperature heat source and any discussion of LTCs may be applied to any lower temperature heat sources, and so forth. For example, other possible heat sources may include geo-thermal heat sources, additional boilers, oil shale, solid waste fuel, biomass, or any other fuel. See e.g., PCT Publication No. WO 2007/052257, U.S. Pat. No. 7,353,653, U.S. Pat. No. 5,497,624, and U.S. Pat. No. 5,704,209, which are hereby incorporated by reference in their entirety. Alternatively, the two or more stages to heat the various working fluids may come from the same solar collector or set of collectors.

The generation of electric power using solar energy in conjunction with concentrated collectors can be an expensive effort. Typical capacity cost for 50 megawatt (MW) plants is in the range of about $5 million to $7 million per MW. This results in an all-in cost of generation that is more than twice that of fossil fuel generation. In an attempt to drive this cost down, developers are moving to larger plants to achieve economy of scale, and to higher temperatures in the power cycle to reach higher efficiency and more plant output per unit area of collector surface. From the power plant design perspective, this drives the solution to a superheated steam Rankine cycle, sometimes with reheat. In pursuit of maximum output and efficiency, a steam plant owner has to deal with several factors, discussed above, that detract from the steam cycle, leading to increased operating costs.

On the other hand, the use of a lower temperature fluid, such as an HFC refrigerant (R245fa), can eliminate many of the drawbacks of the steam cycle but itself is limited by its inability to operate at temperatures much above about 400° F. or 450° F. However, by combining the two in an integrated form, the advantageous features of each can be achieved while bypassing the shortcomings.

In accordance with one aspect of the invention, the steam cycle may be used for only a portion of the electricity (or power) generation. The steam turbine's large, expensive condensing stages can be eliminated, leaving a turbine with only backpressure duty. This may also reduce the manufacturing lead time from three years to about one. In its place, a one- or two-stage organic Rankine cycle (ORC) expander may be used, which may have a comparable expansion efficiency but may only require a one year procurement lead time.

In various embodiments of the invention, the condensing stages of the steam turbine and lower temperature portion of the steam cycle may be replaced by a lower temperature cycle (i.e., ORC) in which a working fluid may contain properties that may be advantageous over steam at temperatures below about 450° F. For instance, the working fluid may be a refrigerant such as R245fa ($CF_3CH_2CHF_2$). The two orders of magnitude difference in specific volume between steam vapor and R245fa vapor at 100° F. may enable dry cooling for the R245fa vapor. Attempting to use an air cooled condenser for steam could be prohibitive in cost due to the substantially large size of the condenser. In this way the water cooling requirement, normally required for steam plants, may be eliminated. Substituting a water-free cooling solution for a solar energy plant may be much more in line with its renewable, sustainable mission, and with the scarcity of water in most solar sites worldwide.

In some implementations, any refrigerant may be used for the working fluid. For example, a refrigerant of embodiments of the invention can be selected from R245fa ($CF_3CH_2CHF_2$), R134a ($CH_2FCF_3$), R125 ($CHF_2CF_3$), R23 (trifluoromethane, $CHF_3$) and R14 (tetrafluoromethane, $CF_4$). Plain hydrocarbon refrigerants (HC) may also be used such as butane, pentane or propane. Alternatively, any fluid may be used as the working fluid for the ORC, including a fluid that may be advantageous over steam at temperatures below about 400° F. or 450° F.

In some embodiments of the invention, the ORC "lower half" may also reduce the complexity and operating cost associated with expanding steam down to a vacuum. At 110° F., saturated steam may have a vapor pressure of about 0.95 psia, while R245fa may have a vapor pressure of about 33.9 psia. This may eliminate the need for a vacuum system and a sophisticated water chemistry system to keep the water sufficiently clean and free of oxygen and to prevent boiler tube corrosion. ORC boilers (also referred to as evaporators) do not require any blow down, which is needed in a steam boiler to eliminate any impurities (or debris) that are directed into the boiler via the feedwater make-up.

The solar collectors may be varied in order to utilize good thermodynamic practice in accordance with some embodiments of the invention. In conventional systems, an entire solar collector field may be of the same design and specification, and capable of providing thermal fluid at a high temperature, which may produce superheated steam for turbine entry. However, such an arrangement may lead to problems with conventional ORC expanders. One problem may be that ORC expanders can operate at several hundred degrees Fahrenheit lower than the steam turbine. Another problem may be installing collectors suited for a first temperature (e.g., 650° F. or 700° F.), for turbine entry at a second, lower temperature (e.g., 600° F.), when the ORC operates at a maximum temperature (e.g., 400° F. or 450° F.) that may be lower than the first and second temperatures. To overcome these problems, a solution may be to produce heat at a temperature slightly above where it is needed. In one embodiment of the invention, this may entail using two thermal oil temperatures from two sets of collectors (e.g., HTC and LTC), each designed and specified for its own temperature duty. Solar collectors may have any configuration or design as known in the art, including, but not limited to, various trough, dish or central receiver designs. This practice may be used in conventional fossil-fired (coal-fired or oil-fired) steam power plants where steam extracted from the turbine is matched to the temperature rise of the feed water entering the boiler.

The benefit of this approach is realized during off-peak operation, such as when the sun is rising and setting (or when there is less demand for electricity). In those cases it will not be possible to achieve design conditions for the steam turbine. However, at a lower temperature the ORC fluid may be vaporized and admitted to the ORC expander to generate additional power, which may enable the operation of a power plant in conditions where conventional steam plants may not function.

FIG. 1A illustrates the operation of a steam/ORC solar thermal power plant in accordance with one aspect of the invention. A thermal transfer loop may be described as follows. A thermal transfer fluid, such as hot thermal oil, from a high temperature collector (HTC) (1), may be used to boil water in a steam boiler and provide superheated steam (3). After heating the steam, the cooled thermal oil may be returned to the HTC (2). In some implementations a circulation pump may be used by the HTC. In some embodiments a thermal transfer fluid may be a thermal oil or any other fluid such as Dowtherm A, Mobiltherm 603, Syltherm 800, or Therminol 66.

In other embodiments of the invention, a thermal transfer loop may include a thermal transfer fluid that may be heated by any heat source known in the art, which may include a high temperature collector, or any solar collector, such as a solar thermal collector, or any other heat source. The thermal transfer fluid of the thermal transfer loop may be a thermal oil as discussed previously, or may be any other type of fluid, which may or may not be the same as another fluid used in the system. In some implementations, the thermal transfer fluid may be a non-steam/water fluid, or may be a fluid of different type from the working fluid of the steam cycle. Alternatively, the thermal transfer fluid may include steam. In some instances, the thermal transfer fluid, which may or may not include steam, may be from a different fluid source as the steam cycle. The thermal transfer loop may or may not be in fluid communication with the steam cycle. In some embodiments, the thermal transfer fluid may be repeatedly cycling within the thermal transfer loop. For instance, the thermal transfer fluid repeatedly cycling within the loop may be contained by the thermal transfer loop. Alternatively, the thermal transfer fluid may flow through the thermal transfer loop without completely being contained.

The thermal transfer fluid may heat a working fluid within a steam portion/cycle.

A steam portion/cycle of the power plant may be described as follows. The superheated steam (3) may enter a steam turbine and can be expanded (4). The steam turbine may be connected to a generator. The expanded steam may have low pressure (4) and can be condensed in a multi-fluid heat exchanger and leave as a condensate (5). The condensate may be fed back to the steam boiler. In some implementations, the condensate may go through a feed pump (7), which may pressurize the condensate to boiler pressure. In some alternate implementations, a working fluid other than water/steam may be used in the steam portion.

In another embodiment, the steam may have a low pressure (4) and may be condensed in the multi-fluid heat exchanger and leave as a condensate (5). In some embodiments, after the steam has been condensed, it may be returned to the multi-fluid heat exchanger. The condensed steam may be used to preheat an ORC working fluid or other fluid within the multi-fluid heat exchanger. Afterwards, steam condensate may be fed back to the steam boiler.

In some embodiments, the steam cycle of the power plant may include a working fluid, such as steam, which may be repeatedly cycled within the steam cycle. For instance, the working fluid may be contained within the steam cycle, and/or any piping or structures thereof. Alternatively, the working fluid of a steam portion may flow through the steam portion without being completely contained. The working fluid of the steam cycle or portion may receive heat from a thermal transfer fluid of a thermal transfer loop. In some embodiments, the working fluid of the steam cycle may be a different fluid from the thermal transfer fluid of the thermal transfer loop (e.g., the working fluid of the steam cycle may be steam while the thermal transfer fluid of the thermal transfer loop may be a thermal oil).

In some embodiments, the working fluid of the steam cycle and the thermal transfer fluid of the thermal transfer loop may have different sources. For example, the working fluid may come from a working fluid source, or may be contained within a steam cycle while the thermal transfer fluid may come from a thermal transfer fluid source that is not the working fluid source and does not share the working fluid source at any stage, or may be contained within the thermal transfer loop.

Figure 1B:
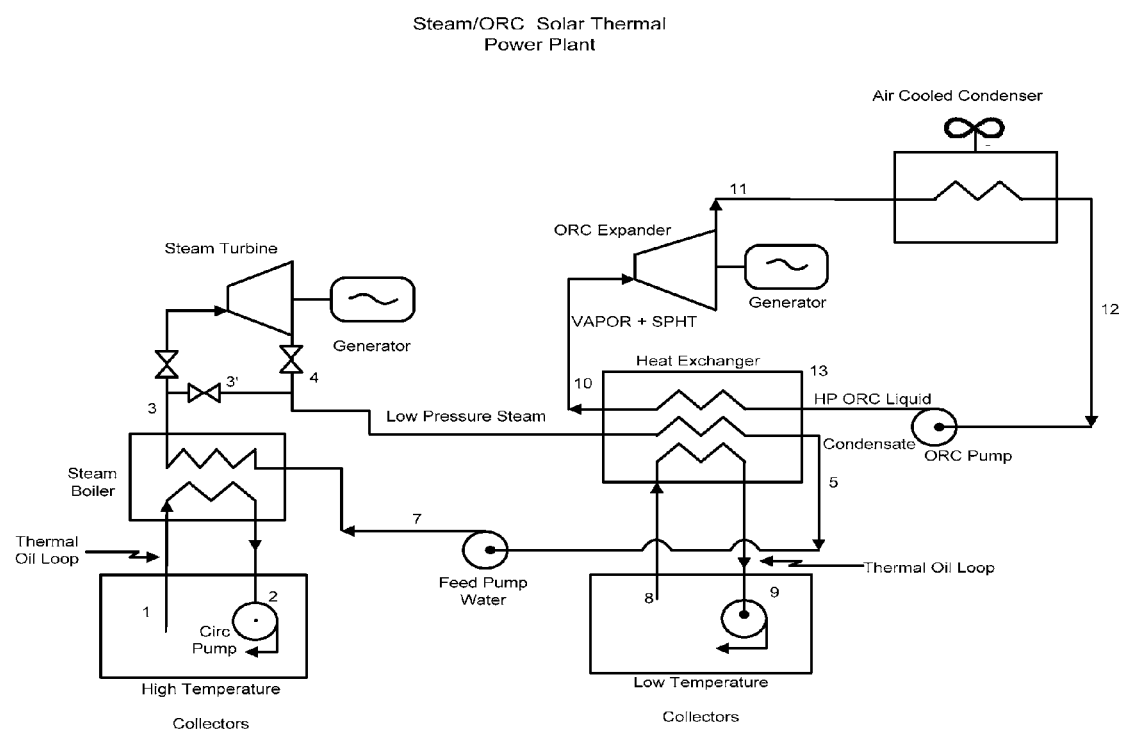
FIG. 1B is a schematic process flow diagram describing the elements of the solar thermal power plant in accordance with another embodiment of the invention.

FIG. 1B shows an alternate configuration of a steam portion/cycle where there may be a bypass around the steam turbine that may go directly to the ORC evaporator (going from (3) directly to (4) via (3')). Valves or other flow control mechanisms known in the art may be used to determine the flow of fluid within the steam portion/cycle. During certain periods, such as during off-peak hours (which may be at sunrise and sunset), there may not be enough solar insolation to get the steam hot enough for turbine entry. For instance, solar insolation may or may not be high enough to get solar collectors (e.g., HTC) hot enough to heat the steam to a sufficient temperature for turbine entry. In such situations, a lower grade or wet steam may still be used to contribute heat to the ORC and may bypass the steam turbine via (3'). Also, during start-up and shut down the steam at (3) may be at a condition (i.e. lower temperature and/or wet) unsuitable for turbine entry and may be used at (3') to heat the ORC refrigerant. At other times, the steam may be directed to enter the steam turbine.

A generator bypass may be selectively controlled to cause the working fluid within the steam portion to bypass the generator of the steam cycle. This bypass may occur when the working fluid in the steam cycle is below a predetermined threshold temperature. Although a generator bypass is only shown for a steam cycle, it may also be provided for an ORC cycle or any other cycle in the system.

A thermal transfer loop may be described as follows. A thermal transfer fluid, such as thermal oil, may be heated by a low temperature collector (LTC) (8) (where the temperature at (8) is lower than the temperature at (1)), and may enter the multi-fluid exchanger and heat a working fluid within the ORC. In some embodiments, the ORC working fluid may be a refrigerant. The thermal oil may leave the heat exchanger and return to the LTC (9). In some embodiments, the thermal oil may return to the LTC after just superheating the ORC working fluid, or after superheating and/or preheating the ORC working fluid within the heat exchanger. In some implementations a circulation pump may be used by the LTC.

As discussed elsewhere, a thermal transfer loop may include a thermal transfer fluid that may be heated by any heat source known in the art, which may include a low temperature collector, or any solar collector, such as a solar thermal collector, or any other heat source. In some embodiments, two or more thermal transfer loops used by the invention may utilize different temperature solar collectors, the same temperature solar collectors, solar collectors from the same field and/or the same solar collector, or any other heat source known or later developed in the art.

In some embodiments, a solar thermal collector or any other heat source corresponding to an ORC cycle may be configured to heat a thermal transfer fluid to a temperature lower than the temperature of a thermal transfer fluid of a solar thermal collector or any other heat source corresponding to a steam cycle. For example, an HTC may heat up associated thermal transfer fluid more than an LTC would.

Furthermore, the thermal transfer fluid of the thermal transfer loop may be a thermal oil as discussed previously, or may be any other fluid. In some implementations, the thermal transfer fluid may be a non-steam/water fluid, or may be a fluid of different type from the working fluid of the steam cycle. Alternatively, the thermal transfer fluid may include steam. In some instances, the thermal transfer fluid, which may or may not include steam, may be from a different fluid source as the steam cycle. The thermal transfer loop may or may not be in fluid communication with the steam cycle. In some embodiments, the thermal transfer fluid may be repeatedly cycling within the thermal transfer loop. For instance, the thermal transfer fluid repeatedly cycling within the loop may be contained by the thermal transfer loop. Alternatively, the thermal transfer fluid may flow through the thermal transfer loop without completely being contained.

The thermal transfer fluid and/or working fluid of the steam cycle may heat the working fluid of an ORC portion/cycle.

An ORC portion/cycle of the power plant may be described as follows. The ORC refrigerant, in high pressure liquid form, may enter the heat exchanger (13) and may be heated, vaporized, and superheated before leaving the heat exchanger (10). The ORC refrigerant may then enter an ORC expander, where the refrigerant vapor may be expanded (11). The ORC expander may be connected to a generator. The refrigerant vapor may then be condensed (12). In some embodiments, a condenser, such as an air cooled condenser may be used to condense the refrigerant vapor. The condensed refrigerant may then be collected and pumped to a boiler pressure (13). In some embodiments, an ORC pump may be used to increase the refrigerant pressure, at which point the cycle may repeat.

The expansion of a fluid through the steam turbine or the ORC expander may impart mechanical work, and may cause a turbine shaft to rotate. The turbine shaft may be coupled to a generator to produce electric power.

With reference to FIGS. 1A and 1B, while one LTC and one HTC are shown, it will be appreciated that multiple LTCs and HTCs may be used. For example, the solar thermal power plant can include 2 LTCs and 2 HTCs, 3 LTCs and 4 HTCs, or any combination of any number of LTCs and HTCs. Alternatively, any discussion of solar collectors or LTCs and HTCs may be applied to other heat sources. In additional alternative embodiments, the HTC and the LTC may be exchanged. For example, any discussion of an HTC may apply to an LTC and vice versa, or may refer to any other solar thermal collector or heat source. In some embodiments, the alternative heat sources may include one, two, three, four, or more temperature levels.

The solar collectors may be varied in order to utilize good thermodynamic practice. In accordance with some embodiments of the invention, a solar collector field may include collectors of varying design and specification. In one embodiment of the invention, two types of collectors (which may or may not have different designs), such as LTCs and HTCs may be used. In other embodiments of the invention, any number of different types of collectors may be used. The different types of collectors may be for heating thermal fluid at different temperature ranges. For example, an LTC, a medium temperature collector, and an HTC may be used.

Any number of heat sources, such as solar collectors, may be used for any number of designated temperature levels, whether they be one, two, three, four, or more temperature levels. In some instances, heat sources for each temperature level may have corresponding working cycles. Each of the working cycles may include any of the components or features discussed for any other working cycle, including, but not limited to an expander, a generator, a condenser, or a heat exchanger. Any working fluid, including those mentioned herein, may be utilized.

Any number of types of cycles may transfer heat within one or more multi-fluid heat exchanger. Any number of fluids may be transferring heat within each multi-fluid heat exchanger. For example, two steam cycles may be simultaneously transferring heat to an ORC within a multi-fluid heat exchanger. A thermal transfer loop may also be transferring heat within the multi-fluid heat exchanger. Thus, any number of heat transfer fluids may be transferring heat to and/or from a working fluid.

Furthermore, any number of multi-fluid heat exchangers may be provided in a system. For example, in systems with three or more cycles, a plurality of multi-fluid heat exchangers may be provided, thus providing a daisy-chained series of cycles. In some instances, each of the multi-fluid heat exchangers may include two or more heat transfer fluids that may transfer heat to a working fluid.

Optionally, depending on the temperature leaving the ORC expander, it may be beneficial to install a recuperator (not shown in FIG. 1A or 1B) to preheat the liquid (12) using the superheat remaining in the expanded vapor at (11).

In various embodiments of the invention, the steam portion and ORC portion of the solar thermal power plant may come together in a multi-fluid heat exchanger. The heat exchanger may act as the ORC evaporator and may be heated from two sources: for example, the expanded steam from the steam turbine (4) and from the thermal oil heated in the LTC (8). In another example, the ORC fluid may be heated from three or more sources: the expanded steam from the steam turbine (4), from the lower pressure wet steam at (3'), from steam condensate, and/or from the thermal oil heated in the LTC (8). As discussed previously, the thermal oil, or any other thermal transfer fluid, may be heated by a heat source other than an LTC. For example, the thermal transfer fluid may be heated by an HTC. In some embodiments, the heat transfer fluids within a multi-fluid heat exchanger may come from a plurality of different fluid sources. For example, a heat exchanger may include fluids from two different sources, such as steam from a steam cycle, and a thermal transfer fluid from a thermal transfer loop. The thermal transfer fluid may be heated by any heat source, such as any solar thermal collector, such as an LTC or HTC. Another example of a heat exchanger with two different fluid sources may include: turbine-expanded steam and lower pressure wet steam from a steam cycle; and thermal transfer fluid from a thermal transfer loop.

This exchanger may also condense the steam as the steam gives up its heat to vaporize the refrigerant. After condensation, water may be returned to the high temperature collector field (7). The thermal oil, which may also provide heat, may be returned to the low temperature collector field (9) after passing through the evaporator. The steam and thermal oil may be changed independently to achieve optimum performance between the steam and ORC portions of the plant. During off-peak periods when the steam may not be hot enough to be admitted to the steam turbine, the steam may still be cycled through the heat exchanger and used for ORC vaporizer duty. Along with thermal oil from the LTC, this can be used to produce electric power via the ORC, even at off-peak hours, which may not be possible in a conventional steam plant.

In alternate embodiments of the invention, the multi-fluid heat exchanger may be heated from any number of sources. In implementations where different numbers of collector types are used, the heat exchanger may include correspondingly heated fluids that may transfer heat within the heat exchanger. For instance, the heat exchanger may include heat transfer fluids from any number of steam (or other working fluid) cycles, and from any number of thermal transfer loops.

Figure 2A:
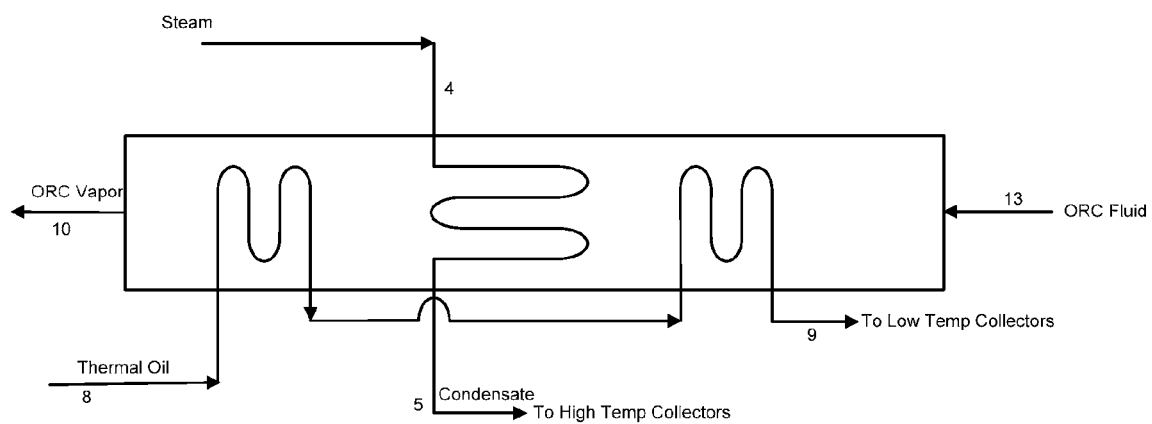
FIG. 2A is a schematic representation of a heat exchanger supplied by two heat sources to convert ORC liquid working fluid into superheated vapor.

FIG. 2A shows a multi-fluid heat exchanger in accordance with one embodiment of the invention. In preferable embodiments, the heat exchanger may have a shell and tube configuration. In some instances, the ORC working fluid (e.g., R245fa) may flow on the shell side, outside the tubes. Alternatively, the ORC working fluid may flow within a tube and the other fluids may flow in the shell configuration. Other heat exchanger configurations know in the art may be used including, but not limited to, plate-type heat exchangers.

The multi-fluid heat exchanger may be comprised of three sections: one for liquid preheat, one for vaporizing and one for superheating. The ORC working fluid (13) may enter a preheater, where thermal oil from the LTC may flow inside the tubes and heat the working fluid to its boiling temperature. In other embodiments, to be discussed further, this preheat duty can be provided by cooling the steam condensate. The thermal oil pipe may then exit the heat exchanger (9). After preheating is complete, the working fluid may come in contact with steam from the exhaust of the steam turbine (4). The steam may be used to vaporize the working fluid, and in the process the steam may be condensed to liquid (condensate) (5). The steam coil is shown in a horizontal design so that the condensate can collect at the bottom of the vessel. Both the vaporization and condensing processes may occur at a constant temperature (isothermal) along two lines parallel to one another at a small difference in temperature (about 15° F.-30° F.). After the steam is condensed, the condensate may be returned to the high-temperature collector (HTC) or to be heated by the HTC or to preheat the ORC fluid. After the working fluid has been completely vaporized, it may be superheated by the thermal oil that has been returned to the boiler (8). The thermal oil may leave and/or re-enter the heat exchanger any number of times. The thermal oil may heat and reheat the working fluid in any number of stages any number of times. The superheated ORC vapor may exit the heat exchanger (10). The heating and cooling lines may be well-matched to provide efficient heat exchange and minimal irreversible loss.

Figure 2B:
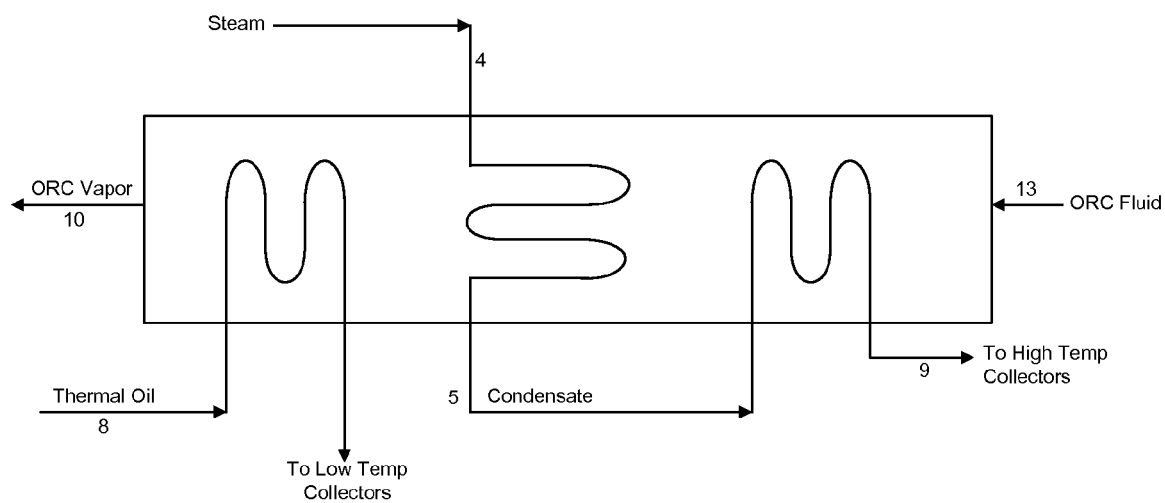
FIG. 2B is a schematic representation of another heat exchanger configuration to convert ORC working fluid into superheated vapor.

FIG. 2B shows a multi-fluid heat exchanger in accordance with another embodiment of the invention. The multi-fluid heat exchanger may be comprised of three sections: one for liquid preheat, one for vaporizing and one for superheating. The ORC working fluid (13) may enter a preheater, where steam condensate may flow inside the tubes and heat the working fluid to its boiling temperature. The steam condensate used for preheating may then exit the heat exchanger (9). After preheating is complete, the working fluid may come in contact with steam from the exhaust of the steam turbine (4). The steam may be used to vaporize the working fluid, and in the process the steam may be condensed to liquid (condensate) (5). The steam coil is shown in a horizontal design so that the condensate can collect at the bottom of the vessel. Both the vaporization and condensing processes may occur at a constant temperature (isothermal) along two lines parallel to one another at a small difference in temperature (about 15° F.-30° F.). After the steam is condensed, the condensate may preheat the ORC fluid. After preheating the ORC fluid, the condensate may be returned to the HTC. The steam condensate may enter and/or re-enter the heat exchanger any number of times and may heat and/or preheat the ORC fluid any number of times. After the working fluid has been completely vaporized, it may be superheated by thermal oil that has been returned to the boiler (8). The thermal oil may leave and/or re-enter the heat exchanger any number of times. After superheating the ORC vapor, the thermal oil may return to the LTC. The superheated ORC vapor may exit the heat exchanger (10). The heating and cooling lines may be well-matched to provide efficient heat exchange and minimal irreversible loss.

In accordance with alternate embodiments of the invention, any fluids may be used for the preheating, vaporizing, and/or superheating sections. For example, excess heat (dumped heat) during peak generation may be used to superheat the ORC fluid, or to assist with any other heating stage of the ORC fluid or any other working fluid. The excess heat may be due to a solar collector multiplier. In some instances, dumped heat during peak generation can be up to 10-15% depending on the solar multiplier used. Such heat may be used seasonally, e.g., may be more available from May to September when ambient temperatures are highest. Utilizing the excess heat from a solar multiplier in an ORC evaporator may generate more output from an ORC portion of the system, since the ORC portion may be more affected by high ambient temperature and back pressure.

Other configurations and sections for the heat exchanger may be provided as is desirable to accommodate various power plant arrangements. For instance, additional heating steps may be provided when the power plant may utilize additional collector stages to heat the various working fluids.

As discussed elsewhere, a multi-fluid heat exchanger may include heat transfer fluids that may transfer heat to an ORC fluid. For example, a multi-fluid heat exchanger may include a first heat transfer fluid and a second heat transfer fluid that may transfer heat to a working fluid of the ORC cycle. The first heat transfer fluid and second heat transfer fluid need not be the same type of fluid; for example, the first heat transfer fluid may be steam and/or water and the second heat transfer fluid may be a thermal oil. The first heat transfer fluid and the second heat transfer fluid may be from different fluid sources; for example, the first heat transfer fluid may include fluid from a steam cycle, while the second heat transfer fluid may include fluid from a thermal transfer loop. In some implementations, a multi-fluid heat exchanger may include a heat transfer fluid that may represent different stages of a fluid source. For example, a heat transfer fluid (such as steam) may be provided by a fluid source (such as a steam cycle) in a plurality of ways, such as steam expanded through a steam turbine from a steam cycle, and lower pressure wet steam from the steam cycle.

A multi-fluid heat exchanger may include any number of heat transfer fluids from any number of fluid sources. Some examples of fluid sources may be steam (or any other working fluid, such as an ORC fluid) cycles or thermal transfer loops. Any number or arrangement of thermal transfer loops may transfer heat to a steam (or ORC fluid or any other fluid) cycle, which may in turn transfer heat to another steam (or fluid) cycle or ORC fluid. Thus various cycles, loops, or other fluid sources may be configured or nested in any manner that may provide a multi-fluid heat exchanger with at least two heat transfer fluids, which may be from at least two different fluid sources, that may transfer heat to a working fluid of an ORC cycle. A multi-fluid heat exchanger may include at least three fluids, where at least one of the fluids is part of an ORC cycle.

Figure 3:
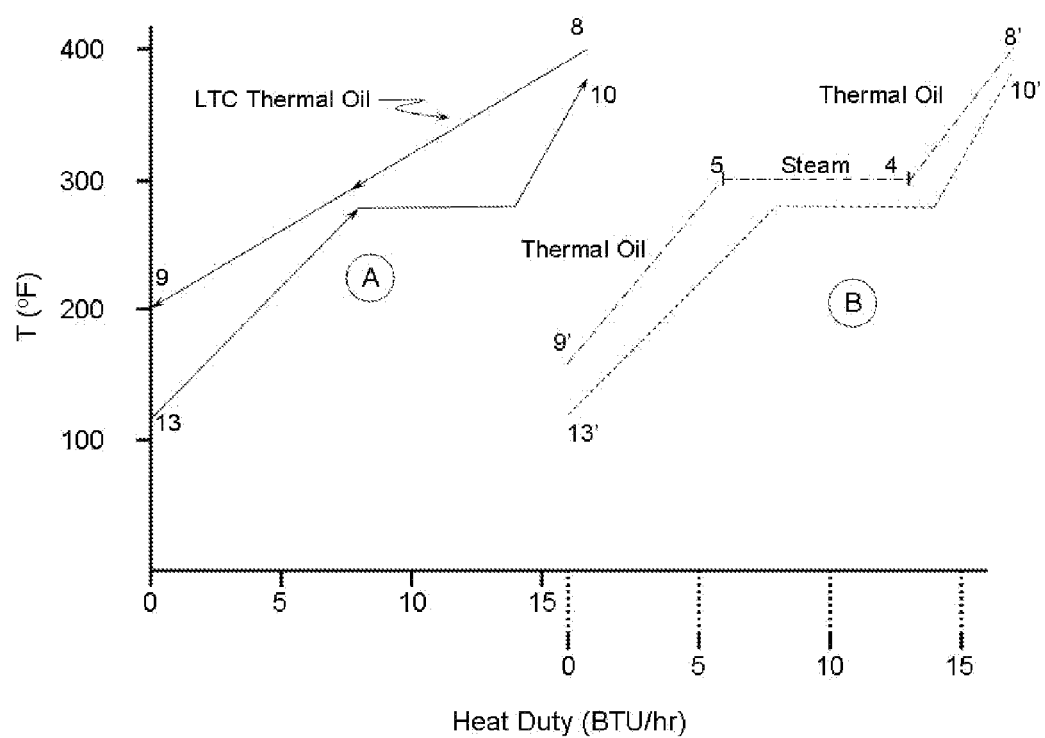
FIG. 3 is a heat acquisition diagram showing the temperature and enthalpy relationship during the heating of the ORC working fluid.

FIG. 3 is a heat acquisition diagram showing the temperature and enthalpy relationship during the heating of an ORC working fluid. The heat exchanger and multi-fluid heat source may improve overall plant performance, compared to two stand-alone plants, by using the heat sources in a way that may keep thermodynamic irreversible losses to a minimum. This can be achieved by using the steam to condense against the vaporizing portion of the ORC heating process. Inasmuch as condensation and vaporizing (boiling) are both isothermal processes, they may thermodynamically complement each other, i.e., the difference in temperature between the condensing steam line and vaporizing ORC refrigerant line may be small and both lines may be parallel to one another. The heating of the ORC liquid and superheating process may both be sloped lines (denoting sensible heating) and match the sloped line of the thermal oil cooling process. This may keep the temperature difference between the lines small and may result in high thermodynamic efficiency and plant thermal efficiency. This can be seen graphically in comparing FIGS. 3A and 3B.

In FIG. 3A, all of the heat supplied to the ORC working fluid may be provided by the LTC thermal oil along line 8-9. The ORC fluid heating curve may be illustrated by line 13-10. The area between line 8-9 and line 13-10 is irreversible thermodynamic loss.

With reference to FIG. 3B, line 9'-5-4-8' represents a case where steam may be introduced from the turbine exhaust and combined with the thermal oil. In such a case, the ORC fluid heating curve (FIG. 3B, line 13'-10') may remain the same. The area between the two lines (i.e., line 9'-5-4-8' and line 13'-10') of FIG. 3B may be smaller than the area between the two lines (i.e., line 9-8 and line 13-10) of FIG. 3A. This indicates that the process in FIG. 3B may result in less irreversible thermodynamic loss, and may therefore be more efficient than the process in FIG. 3A.

By varying the heat supplied by the LTC thermal oil and the steam from the steam cycle, the 9'-5-4-8' line may be altered to reach a desirable profile, which may reduce irreversible thermodynamic loss.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for power generation using solar thermal power, comprising:

heating a first thermal transfer fluid using a first solar collector;

heating a second thermal transfer fluid using a second solar collector to a temperature lower than the temperature of the first thermal transfer fluid heated by the first solar collector;

transferring heat to a first working fluid within a steam power generation cycle using the first thermal transfer fluid; and transferring heat to a second working fluid within an ORC power generation cycle using the second thermal transfer fluid and the first working fluid, wherein transferring heat comprises using the second thermal transfer fluid to superheat a vaporized second working fluid, further comprising preheating the second working fluid with either the first working fluid or second thermal fluid; vaporizing the preheated second working fluid with the first working fluid; and superheating the vaporized second working fluid with the second thermal transfer fluid.

2. The method of claim 1, further comprising utilizing the first working fluid in a steam turbine to generate power when the first working fluid is above or equal to a first temperature and bypassing the steam turbine to heat the second working fluid when the first working fluid is below the first temperature.

3. A method for power generation using solar thermal power, comprising:

heating a first thermal transfer fluid using a first heat source;

heating a second thermal transfer fluid using a second heat source to a temperature lower than the temperature of the first thermal transfer fluid heated by the first heat source;

transferring heat to a first working fluid within a first cycle using the first thermal transfer fluid; and transferring heat to a second working fluid within a second cycle using the second thermal transfer fluid and the first working fluid, wherein heat is transferred to the second working fluid using the second thermal transfer fluid and the first working fluid such that the second thermal transfer fluid transfers heat to the second working fluid in a preheating stage, the first working fluid transfers heat to the second working fluid in a vaporizing stage or preheating stage, and the second thermal transfer fluid transfers heat to the second working fluid in a superheating stage.

4. A solar thermal power generation system comprising:

a first heat transfer fluid comprising steam from a first source;

a second heat transfer fluid comprising thermal oil from a second source different than the first source;

a three-stage, multi-fluid heat exchanger; and an organic Rankine cycle working fluid, wherein the first heat transfer fluid and the second heat transfer fluid transfer heat to the organic Rankine cycle working fluid within the three-stage, multi-fluid heat exchanger.

5. The system of claim 4 wherein the multi-fluid heat exchanger has a shell and tube configuration.

6. The system of claim 5 wherein the organic Rankine cycle working fluid is in the shell portion of the multi-fluid heat exchanger.

7. The system of claim 4 wherein the organic Rankine cycle working fluid is a refrigerant.

8. The system of claim 5 wherein the first heat transfer fluid is within a steam coil with a horizontal design so that condensation is collected at the bottom.

9. The system of claim 4 wherein the first source comprises a first thermal collector and the second source comprises a second thermal collector different from the first thermal collector.

10. A solar thermal power generation system comprising:
a first heat transfer fluid;
a second heat transfer fluid; and
an organic Rankine cycle working fluid,
wherein the first heat transfer fluid and the second heat transfer fluid transfer heat to the organic Rankine cycle working fluid within a multi-fluid heat exchanger, wherein first, the second heat transfer fluid transfers heat to the organic Rankine cycle working fluid; second, the first heat transfer fluid transfers heat to the organic Rankine cycle working fluid; and third, the second heat transfer fluid transfers heat to the organic Rankine cycle working fluid.

* * * * *